US012529325B1

(12) United States Patent
Lefebvre et al.

(10) Patent No.: US 12,529,325 B1
(45) Date of Patent: Jan. 20, 2026

(54) TURBINE EXHAUST DUCT WITH STIFFENERS FOR AIRCRAFT ENGINES

(71) Applicant: PRATT & WHITNEY CANADA CORP., Longueuil (CA)

(72) Inventors: Guy Lefebvre, St-Bruno-de-Montarville (CA); François Doyon, Ste-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/284,076

(22) Filed: Jul. 29, 2025

(51) Int. Cl.
  *F01D 25/30* (2006.01)
  *B64D 33/04* (2006.01)
  *F02C 3/14* (2006.01)
  *F02K 1/40* (2006.01)

(52) U.S. Cl.
  CPC ............ *F01D 25/30* (2013.01); *B64D 33/04* (2013.01); *F02C 3/145* (2013.01); *F02K 1/40* (2013.01); *F05D 2250/52* (2013.01)

(58) Field of Classification Search
  CPC . F01D 25/30; F02C 3/145; F02K 1/40; F05D 2250/52; B64D 33/04
  See application file for complete search history.

(56) References Cited

U.S. PATENT DOCUMENTS

| 3,152,443 | A | 10/1964 | Newland |
| 4,040,249 | A | 8/1977 | Kahle et al. |
| 4,177,638 | A | 12/1979 | Wood |
| 4,765,751 | A | 8/1988 | Pannone et al. |
| 6,290,173 | B1 | 9/2001 | Nickels |
| 8,099,943 | B2 * | 1/2012 | Farber ..................... F01D 25/30 |
| | | | 60/39.5 |
| 8,965,728 | B2 | 2/2015 | Snider et al. |
| 9,157,334 | B2 | 10/2015 | Grede et al. |
| 9,944,393 | B1 * | 4/2018 | Lorence ................. B63H 11/04 |
| 10,119,449 | B2 | 11/2018 | Boekeloo et al. |
| 10,514,003 | B2 * | 12/2019 | Akcayoz ................ F01D 25/30 |
| 10,697,076 | B2 | 6/2020 | Millward et al. |
| 11,319,897 | B2 * | 5/2022 | Joo .......................... F02K 1/40 |
| 11,719,165 | B2 | 8/2023 | Le Pape et al. |
| 11,840,346 | B2 | 12/2023 | Ożóg |
| 11,905,844 | B2 | 2/2024 | Kim et al. |

(Continued)

FOREIGN PATENT DOCUMENTS

EP  3299592 B1  3/2020

*Primary Examiner* — Sang K Kim
(74) *Attorney, Agent, or Firm* — Norton Rose Fulbright Canada LLP (57) ABSTRACT

A turbine exhaust duct (TED) for an aircraft engine, has: a body having a central axis and having an inner wall and an outer wall conjointly defining an annular inlet conduit and outlet conduits communicating with the annular inlet conduit and extending generally radially outward relative to the annular inlet conduit along conduit axes extending transversally to the central axis, the body defining a central passage located radially inwardly of the annular inlet conduit, the outlet conduits having transition areas transitioning from a mainly axial direction to a mainly radial direction; and stiffeners secured to the body and located within the central passage at circumferential positions being in register with the outlet conduits, the stiffeners secured to the transition areas of the outlet conduits, the stiffener extending transversally to both of the central axis and the conduit axes.

20 Claims, 8 Drawing Sheets

(56) References Cited

U.S. PATENT DOCUMENTS

| | | | | |
|---|---|---|---|---|
| 11,952,962 | B1* | 4/2024 | Akcayoz | F02K 1/40 |
| 12,246,844 | B1 | 3/2025 | Weaver et al. | |
| 2009/0263241 | A1* | 10/2009 | Demiraydin | F01D 25/30 |
| | | | | 415/207 |
| 2018/0363588 | A1* | 12/2018 | Iglewski | F02K 1/04 |
| 2024/0150030 | A1 | 5/2024 | Legras et al. | |

* cited by examiner

TURBINE EXHAUST DUCT WITH STIFFENERS FOR AIRCRAFT ENGINES

TECHNICAL FIELD

The application relates generally to aircraft engines and, more particularly, to exhaust cases of such engines.

BACKGROUND

Exhaust ducts are disposed downstream of turbine sections and are configured for evacuating combustion gases that have been used to power the turbine sections. These combustion gases are hot and care should be taken to ensure that the exhaust ducts sustain these harsh conditions. Existing exhaust ducts are satisfactory, but improvements are always sought.

SUMMARY

In one aspect, there is provided a turbine exhaust duct (ted) for an aircraft engine, comprising: a body having a central axis and having an inner wall and an outer wall conjointly defining an annular inlet conduit and outlet conduits communicating with the annular inlet conduit and extending generally radially outward relative to the annular inlet conduit along conduit axes extending transversally to the central axis, the body defining a central passage located radially inwardly of the annular inlet conduit, the outlet conduits having transition areas transitioning from a mainly axial direction to a mainly radial direction; and stiffeners secured to the body and located within the central passage at circumferential positions being in register with the outlet conduits, the stiffeners secured to the transition areas of the outlet conduits, the stiffener extending transversally to both of the central axis and the conduit axes.

The turbine exhaust duct (ted) for an aircraft engine described above may include any of the following features, in any combinations.

In some embodiments, the body defines valleys being diametrically opposed to one another, the valleys facing the central passage and being in register with the outlet conduits.

In some embodiments, the body defines splitters being diametrically opposed to one another and being interspaced between the valleys, the splitters dividing a flow path flowing into the annular inlet conduit into sub-flow paths each flowing into a respective one of the outlet conduits, the stiffeners configured to create load paths extending in a direction parallel to a plane containing the central axis and intersecting the splitters.

In some embodiments, a stiffener of the stiffeners includes a rib and a flange secured to a perimeter of the rib, the flange secured to the body.

In some embodiments, the rib defines a ridge extending from a first end to a second end in a direction being transverse to the central axis and across a respective one of the valleys, the ridge meeting the body tangentially at both of the first end and the second end.

In some embodiments, the stiffener is hollow.

In some embodiments, the stiffeners include two pairs of stiffeners, each pair of the two pairs located at a respective one of the circumferential positions.

In some embodiments, the pair include a first stiffener and a second stiffener being axially offset from the first stiffener relative to the central axis.

In some embodiments, each of the outlet conduits communicating with a respective one of the exit ports; and a fixture interconnecting the ted to the exhaust case, the fixture secured to the annular inlet conduit, the ted being cantilevered off the fixture.

In some embodiments, the annular inlet conduit has an inlet end to receive combustion gases, the fixture connected to the ted at the inlet end.

In some embodiments, the turbine exhaust duct (ted) for an aircraft engine includes gaps extending annularly fully around outlet ends of the outlet conduits.

In another aspect, there is provided a reverse-flow gas turbine engine, comprising: an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining openings; a turbine exhaust duct (ted) fluidly communicating with the turbine section for receiving combustion gases, the turbine exhaust duct having an inlet conduit extending around the central axis, outlet conduits communicating with the inlet conduit and extending through the openings of the exhaust case, and a central passage located radially inwardly of the inlet conduit; and stiffeners secured to the ted and located within the central passage at circumferential positions being in register with the outlet conduits, the stiffener extending from the ted radially inwardly toward the central axis.

The reverse-flow gas turbine engine described above may include any of the following features, in any combinations.

In some embodiments, the ted defines valleys being diametrically opposed to one another, the valleys facing the central passage.

In some embodiments, the ted defines splitters being diametrically opposed to one another and being interspaced between the valleys, the splitters dividing a flow path flowing into the inlet conduit into sub-flow paths each flowing into a respective one of the outlet conduits, the stiffeners configured to create load paths extending in a direction parallel to a plane containing the central axis and intersecting the splitters.

In some embodiments, a stiffener of the stiffeners includes a rib and a flange secured to a perimeter of the rib, the flange secured to the ted.

In some embodiments, the rib defines a ridge extending from a first end to a second end in a direction being transverse to the central axis and across a respective one of the valleys, the ridge meeting the ted tangentially at both of the first end and the second end.

In some embodiments, the stiffener is hollow.

In some embodiments, the stiffeners include two pairs of stiffeners, each pair of the two pairs located at a respective one of the circumferential positions.

In some embodiments, the pair include a first stiffener and a second stiffener being axially offset from the first stiffener relative to the central axis.

In some embodiments, the reverse-flow gas turbine engine includes a fixture interconnecting the ted to the exhaust case, the fixture secured to the inlet conduit, the ted being cantilevered off the fixture.

DESCRIPTION OF THE DRAWINGS

Reference is now made to the accompanying figures in which.

DETAILED DESCRIPTION

Figure 1:
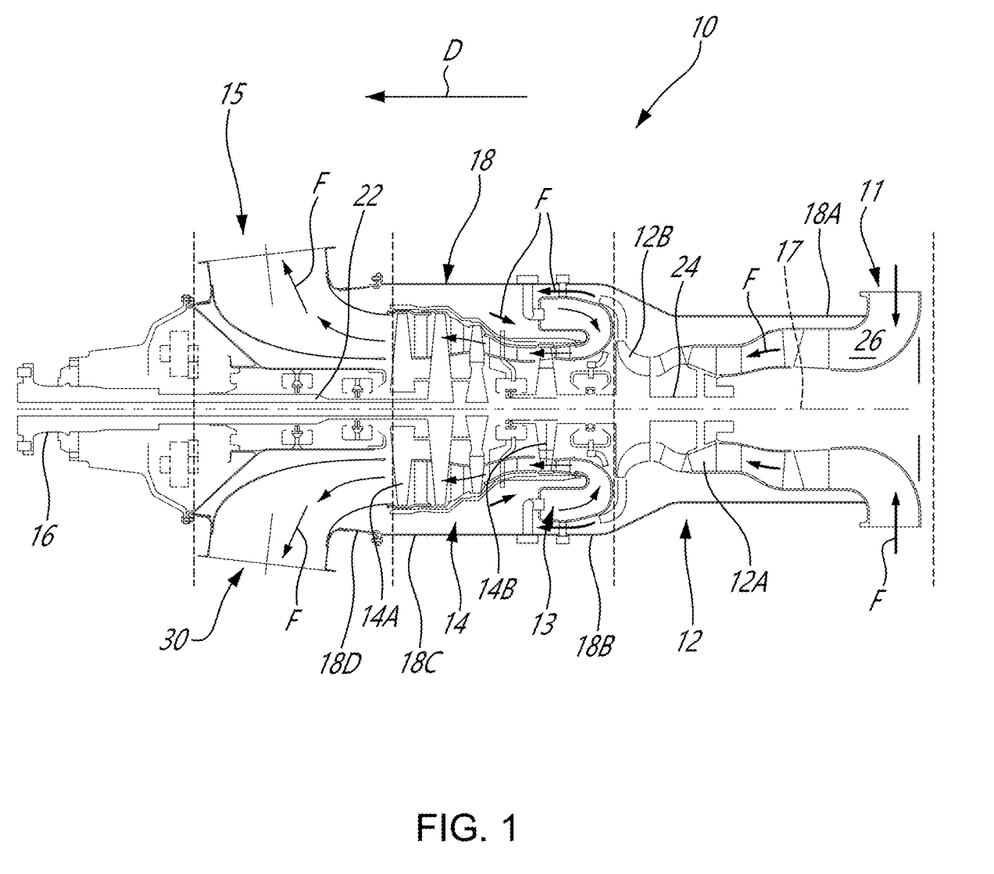
FIG. 1 is a schematic cross-sectional view of an aircraft engine depicted as a turboprop gas turbine engine.

FIG. 1 illustrates an aircraft engine depicted as a gas turbine engine 10 of a type preferably provided for use in subsonic flight, generally comprising in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, an exhaust system 15 through which the combustion gases exit the gas turbine engine 10. The gas turbine engine 10 has a central axis 17. The gas turbine engine 10 in FIG. 1 is a turboprop engine and includes an output shaft 16, which may drive a propulsor, such as a rotor or propeller, for providing thrust for flight and taxiing. It is understood that the gas turbine engine 10 can adopt various other configurations. For instance, the gas turbine engine could be configured as a turboshaft engine having an output shaft connectable to a rotatable load, such as a helicopter rotor or the like.

The gas turbine engine 10 has an outer case assembly 18 housing a core through which gases flow and which includes most of the turbomachinery of the gas turbine engine 10. The illustrated gas turbine engine 10 is a "reverse-flow" engine 10 because gases flow through the core from the air inlet 11 at a rear or aft portion of the gas turbine engine 10, to the exhaust system 15 at a front portion of the gas turbine engine 10. This is in contrast to "through-flow" gas turbine engines in which gases flow through the core of the gas turbine engine from a front portion to a rear portion. The direction of the flow of gases through the gas turbine engine 10 is shown in FIG. 1 with arrows F.

It will thus be appreciated that the expressions "forward" and "aft" used herein may refer to the relative disposition of components of the gas turbine engine 10, in correspondence to the "forward" and "aft" directions of the gas turbine engine 10 and aircraft including the gas turbine engine 10 as defined with respect to the direction of travel D. In the embodiment shown, a component of the gas turbine engine 10 that is "forward" of another component is arranged within the gas turbine engine 10 such that it is located closer to the output shaft 16. Similarly, a component of the gas turbine engine 10 that is "aft" of another component is arranged within the gas turbine engine 10 such that it is further away from the output shaft 16.

Still referring to FIG. 1, the core of the gas turbine engine 10 may include one or more spools. The illustrated embodiment is a two-spool engine including a low pressure (LP) spool and a high pressure (HP) rotatable about the central axis 17 to perform compression to pressurize the air received through the air inlet 11, and to extract energy from the combustion gases before they exit the core via the exhaust system 15 at a forward end of the core. The core may include other components as well, including, but not limited to internal combustion engines (e.g. rotary engines such as Wankel engines for compounding power with a turbine of the turbine section), gearboxes, tower shafts, and bleed air outlets.

Each spool generally includes at least one component to compress the air that is part of the compressor section 12, and at least one component to extract energy from the combustion gases that is part of the turbine section 14. More particularly, according to the illustrated embodiment, the LP spool has an LP turbine 14A which extracts energy from the combustion gases, and an LP compressor 12A for pressurizing the air. The LP turbine 14A and the LP compressor 12A can each include one or more stages of rotors and stators, depending upon the desired engine thermodynamic cycle, for example. The LP spool further comprises an LP shaft 22 drivingly connecting the LP turbine 14A to the LP compressor 12A. Gears (not shown) can be provided to allow the LP compressor 12A to rotate at a different speed than the LP turbine 14A. The LP turbine 14A may also drivingly connected to the output shaft 16 via a RGB.

Still referring to FIG. 1, the HP spool comprises an HP turbine 14B drivingly engaged (e.g. directly connected) to a HP compressor 12B by a high pressure shaft 24. Similarly to the LP turbine 14A and the LP compressor 12A, the HP turbine 14B and the HP compressor 12B can each include one or more stages of rotors and stators. The LP compressor 12A, the HP compressor 12B, the combustor 13, the HP turbine 14B and the LP turbine 14A are in serial flow communication via a gas path 26 being annular and extending through the core about the central axis 17. The gas path 26 leads to the exhaust system 15 downstream of the turbine section 14.

The outer case assembly 18 includes a plurality of cases disposed along the central axis 17 of the gas turbine engine 10. These cases are secured to one another at mating flanges using suitable fastening means, such as nuts and bolts. Any fastening means are contemplated. The outer case assembly 18 includes a compressor case 18A enclosing the compressor section 12, a combustor case 18B enclosing the combustor 13, a turbine case 18C enclosing the turbine section 14, and an exhaust case 18D being part of the exhaust system 15.

Figure 2:
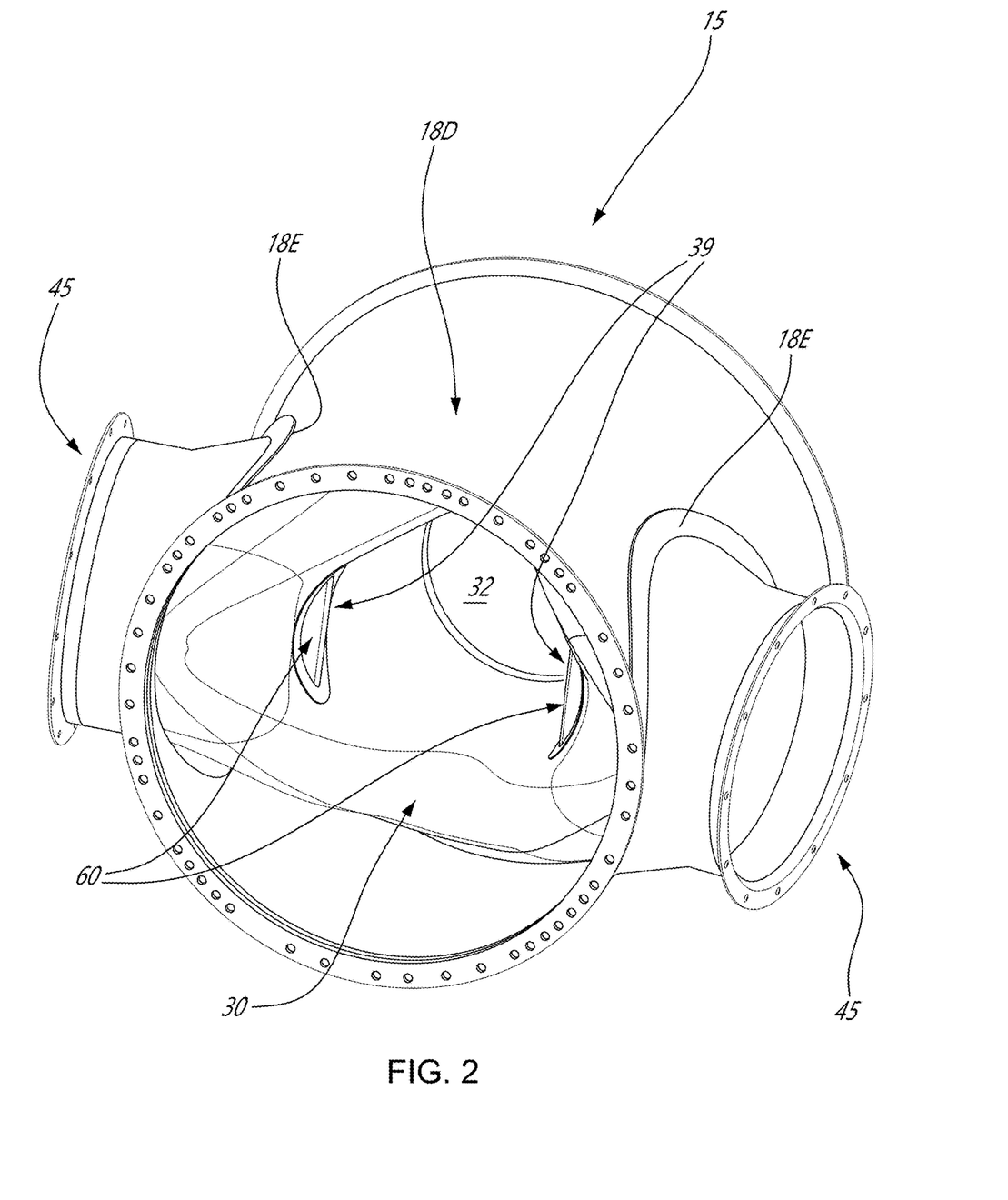
FIG. 2 is a three dimensional view of an exhaust system of the aircraft engine of FIG. 1.
Figure 3:
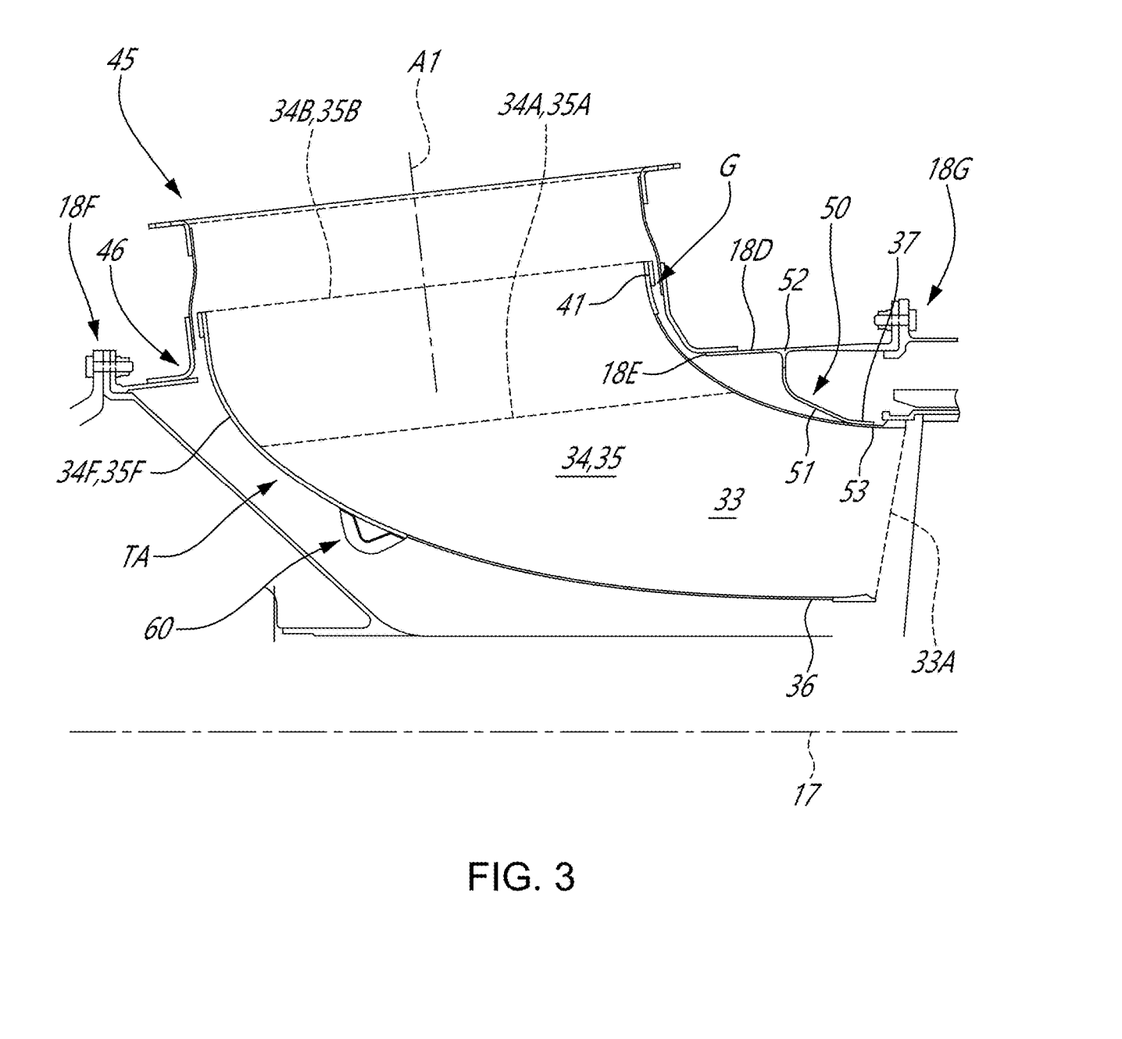
FIG. 3 is a cross-sectional view of the exhaust system of FIG. 2.

Referring to FIGS. 1-3, the exhaust system 15 of the gas turbine engine 10 comprises a turbine exhaust duct (TED) 30 secured to the exhaust case 18D. The exhaust case 18D extends circumferentially around the central axis 17 and defines openings 18E, two openings in this embodiment, sized for receiving portions of the turbine exhaust duct 30 that will be described below. The two openings 18E may be diametrically opposed to one another. More or less than two openings may be used in some embodiments.

Figure 4:
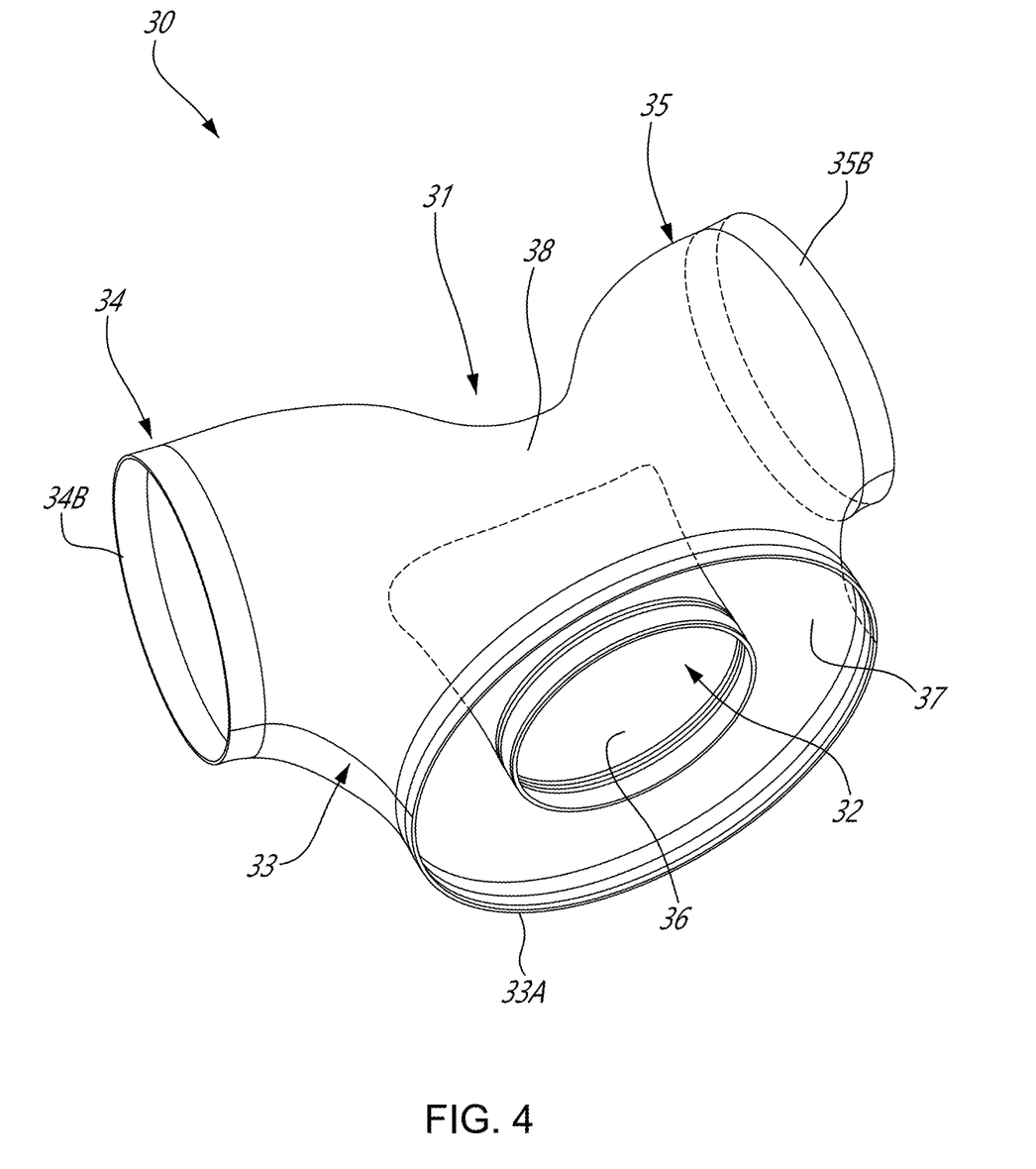
FIG. 4 is a three dimensional view of a turbine exhaust duct of the exhaust system of FIG. 3.

Referring now to FIG. 4, the turbine exhaust duct 30 is described in more detail. The turbine exhaust duct 30 is used for exhausting combustion gases received from the last stage of the LP turbine 14A. According to the illustrated embodiment, the turbine exhaust duct 30 is a non-axisymmetric dual port exhaust duct configured for directing combustion gases laterally on opposed sides of the outer case assembly 18 of the gas turbine engine 10. The turbine exhaust duct 30 is qualified as "non-axisymmetric" because the two exhaust ports thereof are not coaxial to the central axis 17 of the gas turbine engine (i.e., the exhaust flow discharged from the exhaust duct is not axial, it is rather directed in a direction that diverges from the central axis 17). According to at least some embodiments, the TED 30 has a generally "Y-shaped" body 31 including an inlet conduit 33 extending axially around the central axis 17 for receiving the annular flow of combustions gases discharged from the last stage of LP turbine 14A, and first and second outlet conduits 34, 35 branching off laterally from the inlet conduit 33. According to some embodiments, the first and second outlet conduits 34, 35 are identical.

As can be appreciated from FIG. 1, the downstream end of each outlet conduit 34, 35 projects outwardly of the exhaust case 18D. As best shown in FIG. 3, each outlet conduit 34, 35 terminates into an exhaust port. The outlet conduits 34, 35 extend along respective axes that intersect the central axis 17. According to the illustrated embodiment, these axes has a main radial component and a secondary (i.e., smaller) axial component relative to the central axis 17. Stated differently, the exhaust ports of the outlet conduits 34, 35 are oriented to direct the combustion gases mainly in a radially outward direction. According to some embodiments, the exhaust port opening of the outlet conduits 34, 35 are circular. However, it is understood that other geometries are contemplated as well (e.g., oval).

Figure 5:
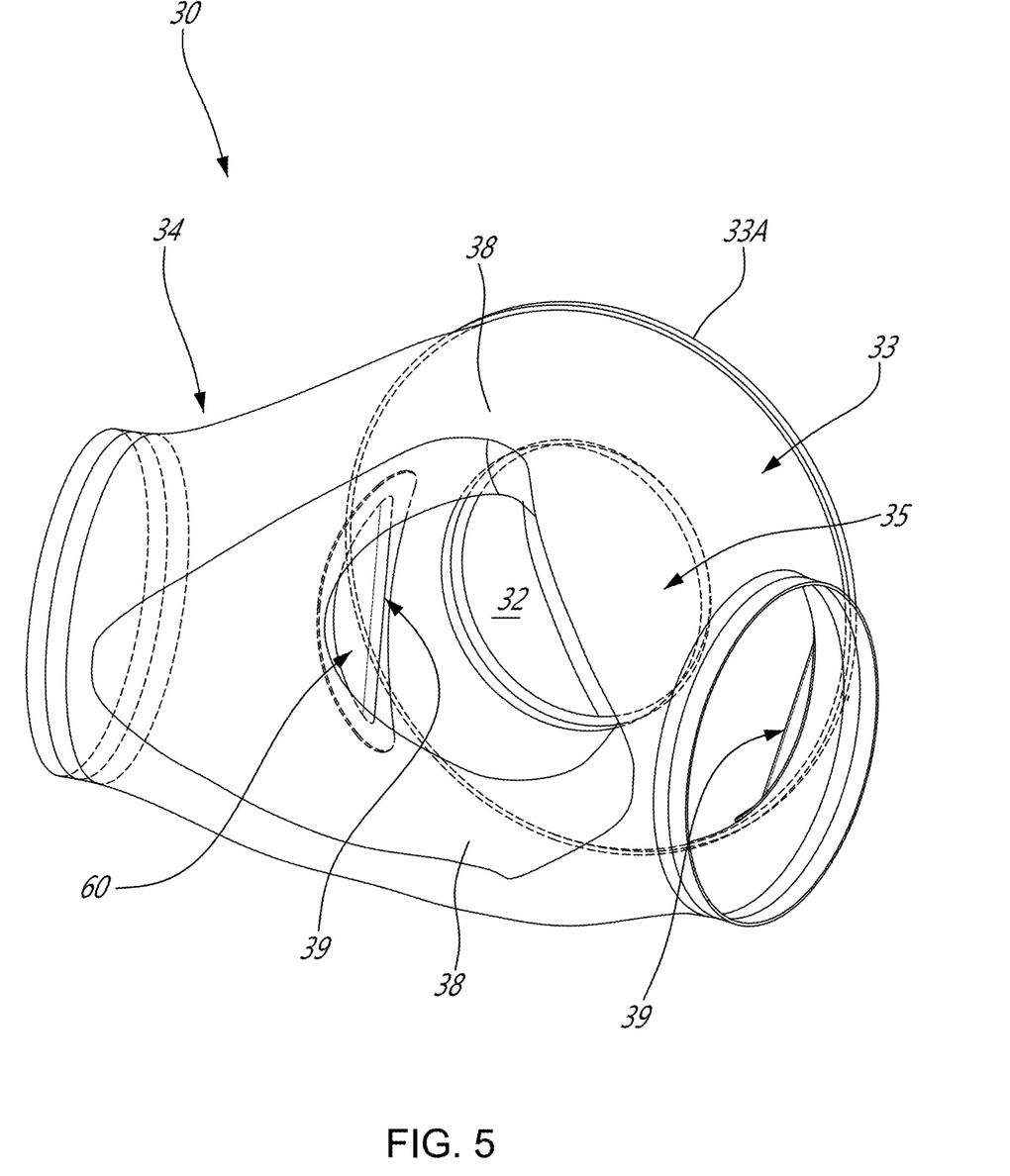
FIG. 5 is another three dimensional view of the turbine exhaust duct of FIG. 4.

Referring to FIGS. 3-5, the Y-shaped body 31 of the turbine exhaust duct 30 defines a fluid flow passage(s) about a central bore or central passage 32 for accommodating a shaft engine. The fluid flow passage of the annular body 31 generally includes the inlet conduit 33 through which the bore 32 extends, and in this example the two outlet conduits 34, 35 branching off from the inlet conduit 33 and extending radially away therefrom relative to the central axis 17. It is understood that the inlet and outlet conduits 33, 34, 35 may adopt various configurations. For instance, they can take the form of cylindrically straight or curved conduits. If desired, the body 31 may include more than two outlet conduits. The outlet conduits 34, 35 may not be perpendicularly positioned relative to the inlet conduit 33 (i.e., be purely radially oriented with respect thereto), but rather may extend both radially and axially with respect thereto. Therefore, the body 31 could adopt various configurations including T-shaped and Y-shaped configurations. It is understood that any suitable configurations for the inlet and exhaust conduits may be used.

The inlet conduit 33 includes an inlet end 33A located adjacent the turbine section 14 for receiving combustion gases therefrom. The outlet conduits 34, 35 are generally cylindrical in shape in this example (though any suitable shape may be employed) and have respective outlet centerlines which extend at an angle relative to each other. As shown in FIGS. 3 and 4, the outlet conduits 34, 35 have corresponding inlet ends 34A, 35A (FIG. 3) and outlet ends 34B, 35B. The inlet ends 34A, 35A are defined at the intersection between the inlet conduit 33 and the outlet conduits 34, 35, as shown schematically by the dotted lines in FIG. 3.

Referring to FIGS. 4-5, the inlet conduit 33 is annular about the central axis 17, which also defines the central axis of the inlet conduit 33. The inlet conduit 33 is defined by an inner peripheral wall 36 and an outer peripheral wall 37. The outer peripheral wall 37 is a circumscribing wall of the inlet conduit 33, and constitutes a periphery of the inlet conduit 33. The inlet conduit 33 may include two circumferentially spaced-apart splitters 38. The splitters 38 may take the form of raises or bumps formed inside the body 31 at a bottom of the inlet conduit 33 and project in a direction toward the central axis 17. The splitters 38 are configured to split the inlet flow in two to direct the two flows towards the outlet conduits 34, 35. The splitters 38 may be omitted in some configurations. Put differently, the splitters 38 divide a flow path flowing into the inlet conduit 33 into sub-flow paths each flowing into a respective one of the outlet conduits 34, 35.

As shown in FIGS. 4-5, the outer peripheral wall 37 and the inner peripheral wall 36 are connected to one another at the outlet ends 34B, 35B of the outlet conduits 34, 35. It may therefore be said that the outlet conduits 34, 35 are defined conjointly by the inner peripheral wall 36 and the outer peripheral wall 37. In other words, the inner peripheral wall 36 and the outer peripheral wall 37 are cylindrically shaped at the inlet end 33A of the inlet conduit 33 and their shape diverge from the central axis 17 and merge together to conjointly define the outlet ends 34B, 35B of the outlet conduits 34, 35.

Referring to FIGS. 2-3, the exhaust system 15 further includes exhaust ports 45 secured to the exhaust case 18D and being in register with the openings 18E, which are located between forward and rearward ends 18F, 18G of the exhaust case 18D relative to the direction of travel T. The exhaust ports 45 protrude away from the exhaust case 18D in a direction having a radial component relative to the central axis 17. The exhaust ports 45 each extend circumferentially around conduit axes A1 that are transverse to the central axis 17. As illustrated, the exhaust ports 45 are secured to the exhaust case 18D via fairings 46 that bridge gaps defined between peripheries of the openings 18E and the exhaust ports 45.

Referring back to FIG. 3, in the depicted environment, the turbine exhaust duct 30 is secured to the exhaust case 18D solely via the inlet conduit 33. In other words, the turbine exhaust duct 30 is cantilevered off a fixture 50 that is used to interconnect the turbine exhaust duct 30 to the exhaust case 18D. As illustrated, the fixture 50 is connected to the turbine exhaust duct 30 at the inlet end 33A of the inlet conduit 33. More specifically, the fixture 50 is connected to the outer peripheral wall 37 and the peripheral inner wall 36 may be free of connection to surrounding structure (e.g., exhaust case 18D).

To enable the turbine exhaust duct 30 to freely expand due to thermal growth, gaps G may be located annularly fully all around the outlet ends 34B, 35B of the outlet conduits 34, 35 of the turbine exhaust duct 30. In other words, the outlet conduits 34, 35 may be free of contact with the exhaust case 18D. This, in turn, may allow thermal growth of the turbine exhaust duct 30 without imparting stress on the exhaust case 18D. To reinforce the outlet ends 34B, 35B of the outlet conduits 34, 35, exhaust rings 41 are mounted to the outlet conduits 34, 35 at or proximate the outlet ends 34B, 35B. The exhaust rings 41 extend all around the outlet ends 34B, 35B of the outlet conduits 34, 35. In some applications, the exhaust rings 41 may also reduce vibrations of the turbine exhaust duct 30.

Referring back to FIGS. 2-3, in the embodiment shown, the turbine exhaust duct 30 defines two valleys 39, although more than two valleys 39 may be present if the turbine exhaust duct 30 has more than two outlet conduits 34, 35. The valleys 39 are diametrically opposed to one another and are facing the central passage 32. Each of the valleys 39 is in register with a respective one of the outlet conduit 34, 35. In other words, the valleys 39 are circumferentially aligned with the outlet conduits 34, 35 relative to the central axis 17. The valleys 39 are interspaced between the splitters 38 (FIG. 5). It will be understood that the valleys 39 are seen when looking into the central passage 32. From within the turbine exhaust duct 30, the valleys 39 would appear as bumps. The valleys 39 define transition areas TA that are used to redirect the combustion gases from a mainly axial orientation to a mainly radial orientation relative to the central axis 17. The transition areas TA thus transition from a mainly axial direction to a mainly radial direction. In the context of the present disclosure, the expression "mainly" as in "mainly axial" implies that a greatest component of a direction is along an axial direction relative to the central axis 17.

It has been observed by inventors of the present disclosure that the turbine exhaust duct 30 is subjected to vibrations caused by the flow of combustion gases flowing through it, the rotation of the shaft(s) of the gas turbine engine 10 and so on. Put differently, the architecture of the turbine exhaust duct 30 is exposed to strong vibrations during operation. The thickness of the sheet metal of the turbine exhaust duct 30 is reduced to a minimum to optimize the weight of the part. The turbine exhaust duct 30 may be an asymmetrical exhaust architecture that may be highly sensitive to dynamic excitations. These dynamic excitations are generated by unbalances, bearings, unstable aerodynamic flows, etc. These excitations may induce stresses and displacements during engine operation. The turbine exhaust duct 30 of the present disclosure has features that may at least partially alleviate these drawbacks.

In the embodiment shown, stiffeners 60 are secured to the turbine exhaust duct 30 to increase a rigidity or stiffness of the turbine exhaust duct 30. The stiffeners 60 are diametrically opposed to one another and are interspaced between the valleys 39. The stiffeners 60 are located within the central passage 32 at circumferential positions being in register with the outlet conduits 34, 35. Each of the outlet conduits 34, 35 may be associated with a respective one of the stiffeners 60. The stiffeners 60 may be secured to the transition areas TA of the outlet conduits 34, 35. As illustrated, the stiffener 60 extend transversally to both of the central axis 17 and the conduit axes A1. The stiffeners 60 extend from the turbine exhaust duct 30 radially inwardly toward the central axis 17. They may be said to protrude into the central passage 32.

Figure 6:
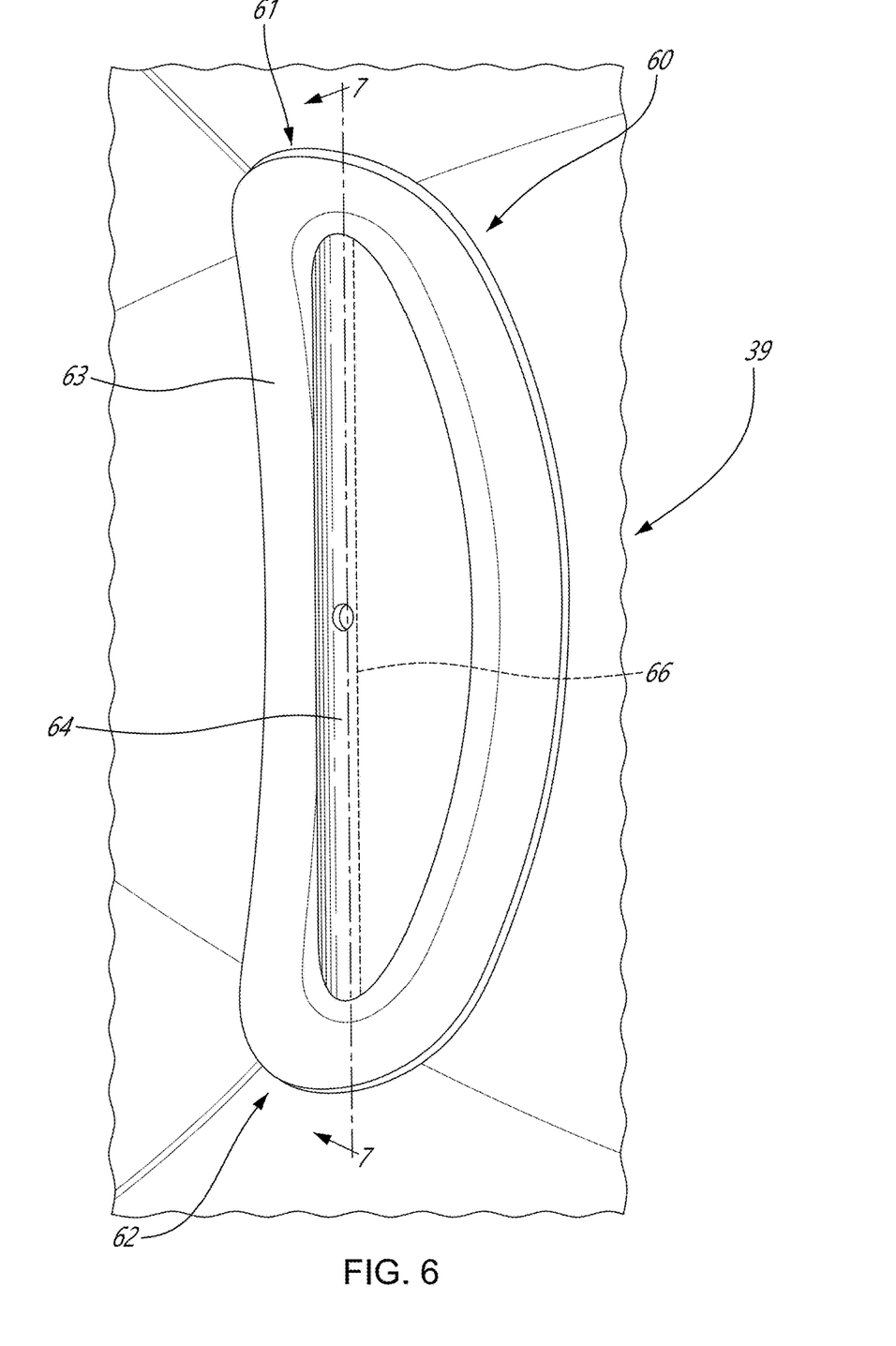
FIG. 6 is a three dimensional view illustrating a stiffener for the turbine exhaust duct of FIG. 4.
Figure 7:
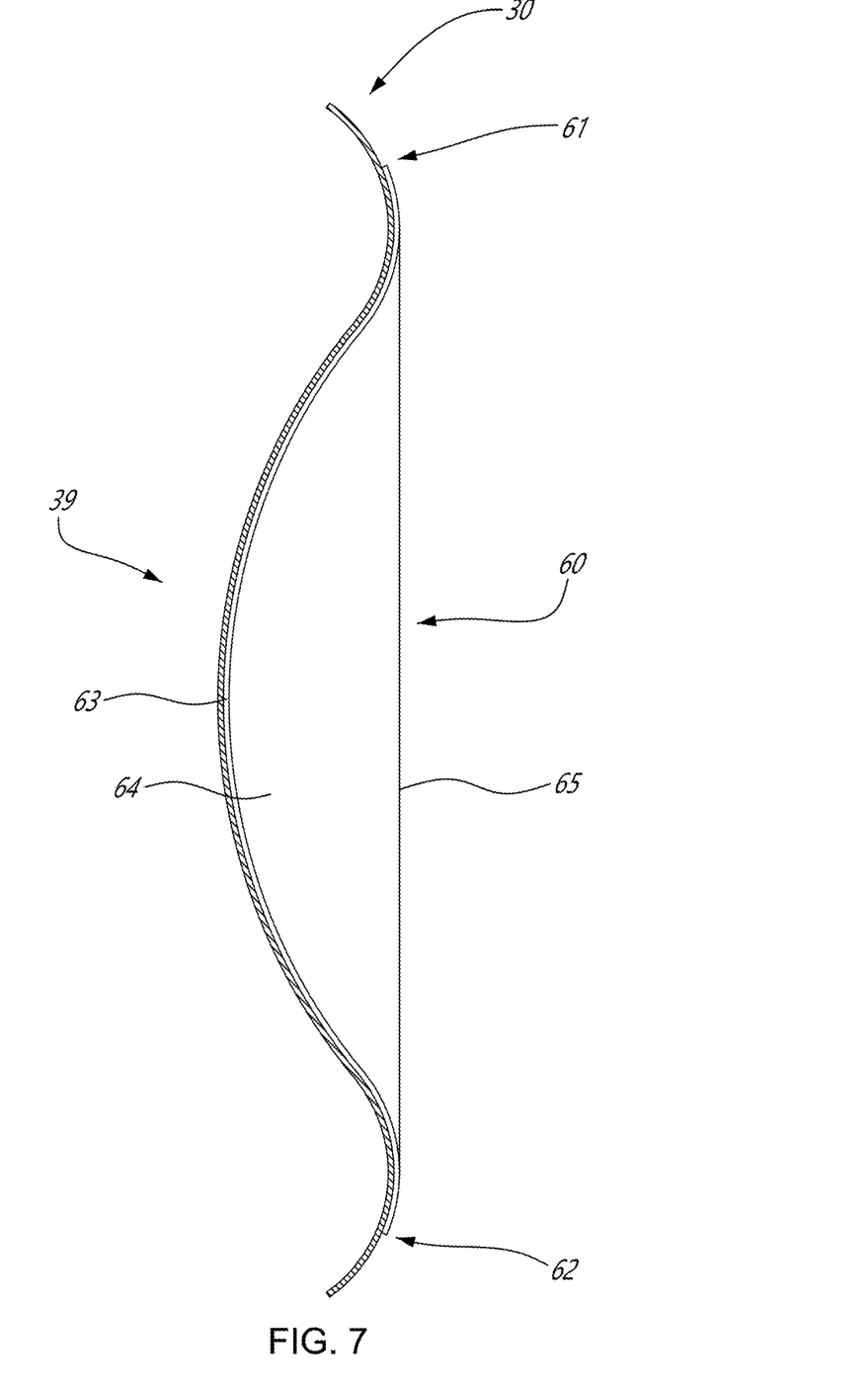
FIG. 7 is a cross-sectional view taken along line 7-7 on FIG. 2 and on a plane being normal to a central axis of the aircraft engine of FIG. 1.

Referring more particularly FIGS. 6-7, a stiffener is shown in greater detail. The below description uses the singular form for clarity, but may apply to each of the stiffeners 60.

In the depicted embodiment, the stiffener 60 extends from a first end 61 to a second end 62 opposite the first end 61. The stiffener 60 is configured to create a load path extending in a direction parallel to a plane containing the central axis 17 and intersecting the splitters 38. The load path extends parallel to a line interconnecting the first end 61 to the second end 62. The stiffener 60 includes a flange 63 and a rib 64 secured to the flange 63. The rib 64 is used to increase the stiffness of the turbine exhaust duct 30 while the flange 63 is used to secure the stiffener 60 to the turbine exhaust duct 30. In other words, the stiffener 60 is secured to the turbine exhaust duct 30 via the flange 63. The flange 63 may extend fully around a perimeter of the rib 64. The flange 63 is secured to the turbine exhaust duct 30 via any suitable fastening means, such as brazing, welding, fasteners, and so on. The flange 63 need not fully extend around the rib 64. The rib 64 and the flange 63 may be two parts of a single monolithic body. The stiffener 60 may be made of a single piece of sheet metal being stamped to impart the shape illustrated in FIG. 6. Thus, the stiffener 60 may be hollow and encloses a cavity defined between the rib 64 and the turbine exhaust duct 30. Other manufacturing means, such as milling, casting, additive manufacturing and so on may be used.

As shown, the rib 64 defines a ridge 66 extending from the first end 61 to the second end 62 in a direction being transverse to the central axis 17 and across a respective one of the valleys 39. Hence, it may be said that the stiffeners 60 create bridges interconnecting two parts of the turbine exhaust duct 30 across the valleys 39. As depicted in FIG. 7, the ridge 66 may meet the turbine exhaust duct 30 tangentially at both of the first end 61 and the second end 62. This may contribute in providing the greatest stiffness increase using the stiffeners 60 while avoiding the stiffener 60 from intersecting other components of the gas turbine engine 10, such as the shafts, that passes through the central passage 32. The tangential aspect described above is seen in a plane being normal to the central axis 17 and intersecting the ridge 66.

Figure 8:
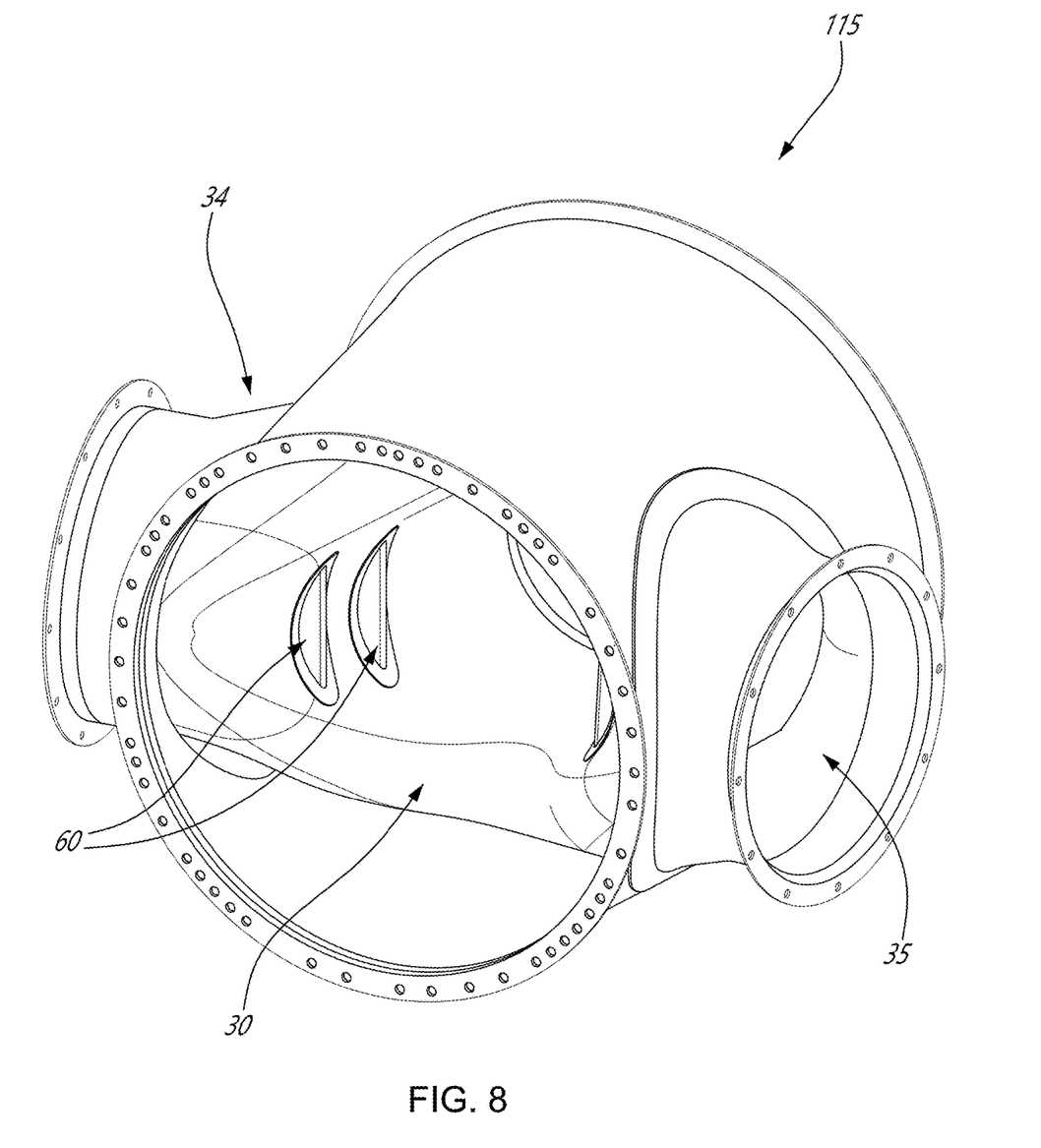
FIG. 8 is a three dimensional view of an exhaust system in accordance with another embodiment.

Referring to FIG. 8, another embodiment of an exhaust system is shown at 115. For the sake of conciseness, only features differing from the exhaust system 15 described above are described below.

In the embodiment shown, the turbine exhaust duct 30 of the exhaust system 115 includes two pairs of stiffeners 60. Each pair of the two pairs is located at a respective one of the circumferential positions corresponding to that of the outlet conduits 34, 35 and being axially offset from one another relative to the central axis 17. Within each of the two pairs, the stiffeners 60 may vary in length such that the stiffeners 60 meet the turbine exhaust duct 30 tangentially at both of their opposite ends as explained above. In the embodiment shown, the stiffeners 60 that are located rearwardly, that is, closest to the turbine section 14, may have a longer length since a span of the valleys 39 decreases in a direction extending away from the turbine section 14.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A turbine exhaust duct (TED) for an aircraft engine, comprising:
   a body having a central axis and having an inner wall and an outer wall conjointly defining an annular inlet conduit and outlet conduits communicating with the annular inlet conduit and extending generally radially outward relative to the annular inlet conduit along conduit axes extending transversally to the central axis, the body defining a central passage located radially inwardly of the annular inlet conduit, the outlet conduits having transition areas transitioning from a mainly axial direction to a mainly radial direction; and
   stiffeners secured to the body and located within the central passage at circumferential positions being in register with the outlet conduits, the stiffeners secured to the transition areas of the outlet conduits, the stiffener extending transversally to both of the central axis and the conduit axes.

2. The TED of claim 1, wherein the body defines valleys being diametrically opposed to one another, the valleys facing the central passage and being in register with the outlet conduits.

3. The TED of claim 2, wherein the body defines splitters being diametrically opposed to one another and being interspaced between the valleys, the splitters dividing a flow path flowing into the annular inlet conduit into sub-flow paths each flowing into a respective one of the outlet conduits, the stiffeners configured to create load paths extending in a direction parallel to a plane containing the central axis and intersecting the splitters.

4. The TED of claim 2, wherein a stiffener of the stiffeners includes a rib and a flange secured to a perimeter of the rib, the flange secured to the body.

5. The TED of claim 4, wherein the rib defines a ridge extending from a first end to a second end in a direction being transverse to the central axis and across a respective one of the valleys, the ridge meeting the body tangentially at both of the first end and the second end.

6. The TED of claim 4, wherein the stiffener is hollow.

7. The TED of claim 1, wherein the stiffeners include two pairs of stiffeners, each pair of the two pairs located at a respective one of the circumferential positions.

8. The TED of claim 7, wherein the pair include a first stiffener and a second stiffener being axially offset from the first stiffener relative to the central axis.

9. An exhaust system comprising the TED of claim 1 and further comprising:
   an exhaust case surrounding the central axis and defining exit ports, each of the outlet conduits communicating with a respective one of the exit ports; and
   a fixture interconnecting the TED to the exhaust case, the fixture secured to the annular inlet conduit, the TED being cantilevered off the fixture.

10. The exhaust system of claim 9, wherein the annular inlet conduit has an inlet end to receive combustion gases, the fixture connected to the TED at the inlet end.

11. The exhaust system of claim 9, comprising gaps extending annularly fully around outlet ends of the outlet conduits.

12. A reverse-flow gas turbine engine, comprising:
   an outer case assembly extending around a central axis and enclosing a core, the core including a compressor section, a combustor, and a turbine section, the turbine section located forward of the combustor and of the compressor section relative to a direction of travel of the reverse-flow gas turbine engine, the outer case assembly including an exhaust case defining openings;
   a turbine exhaust duct (TED) fluidly communicating with the turbine section for receiving combustion gases, the turbine exhaust duct having an inlet conduit extending around the central axis, outlet conduits communicating with the inlet conduit and extending through the openings of the exhaust case, and a central passage located radially inwardly of the inlet conduit; and
   stiffeners secured to the TED and located within the central passage at circumferential positions being in register with the outlet conduits, the stiffener extending from the TED radially inwardly toward the central axis.

13. The reverse-flow gas turbine engine of claim 12, wherein the TED defines valleys being diametrically opposed to one another, the valleys facing the central passage.

14. The reverse-flow gas turbine engine of claim 13, wherein the TED defines splitters being diametrically opposed to one another and being interspaced between the valleys, the splitters dividing a flow path flowing into the inlet conduit into sub-flow paths each flowing into a respective one of the outlet conduits, the stiffeners configured to create load paths extending in a direction parallel to a plane containing the central axis and intersecting the splitters.

15. The reverse-flow gas turbine engine of claim 13, wherein a stiffener of the stiffeners includes a rib and a flange secured to a perimeter of the rib, the flange secured to the TED.

16. The reverse-flow gas turbine engine of claim 15, wherein the rib defines a ridge extending from a first end to a second end in a direction being transverse to the central axis and across a respective one of the valleys, the ridge meeting the TED tangentially at both of the first end and the second end.

17. The reverse-flow gas turbine engine of claim 15, wherein the stiffener is hollow.

18. The reverse-flow gas turbine engine of claim 12, wherein the stiffeners include two pairs of stiffeners, each pair of the two pairs located at a respective one of the circumferential positions.

19. The reverse-flow gas turbine engine of claim 18, wherein the pair include a first stiffener and a second stiffener being axially offset from the first stiffener relative to the central axis.

20. The reverse-flow gas turbine engine of claim 12, comprising a fixture interconnecting the TED to the exhaust case, the fixture secured to the inlet conduit, the TED being cantilevered off the fixture.

* * * * *